United States Patent
Runge

(10) Patent No.: US 10,638,675 B2
(45) Date of Patent: May 5, 2020

(54) IRRIGATION CONTROLLER WITH WEATHER STATION

(71) Applicant: The Toro Company, Bloomington, MN (US)

(72) Inventor: Thomas H. Runge, Manasquan, NJ (US)

(73) Assignee: The Toro Company, Bloomington, MN (US)

( * ) Notice: Subject to any disclaimer, the term of this patent is extended or adjusted under 35 U.S.C. 154(b) by 378 days.

(21) Appl. No.: 15/090,495

(22) Filed: Apr. 4, 2016

(65) Prior Publication Data

US 2016/0212952 A1 Jul. 28, 2016

Related U.S. Application Data

(63) Continuation of application No. 13/406,410, filed on Feb. 27, 2012, now Pat. No. 9,301,460.

(60) Provisional application No. 61/446,872, filed on Feb. 25, 2011.

(51) Int. Cl.
*A01G 25/16* (2006.01)

(52) U.S. Cl.
CPC .............. *A01G 25/16* (2013.01); *Y02A 40/50* (2018.01)

(58) Field of Classification Search
CPC ....... A01G 25/167; A01G 25/16; G01W 1/14; G05B 2219/2625; G05B 19/05; G05B 15/02; G05B 19/042
See application file for complete search history.

(56) References Cited

U.S. PATENT DOCUMENTS

| | | | | |
|---|---|---|---|---|
| 5,250,941 A * | 10/1993 | McGregor | ............ | G06M 1/108 340/12.18 |
| 5,593,779 A * | 1/1997 | Mori | ............... | C12N 11/08 428/375 |
| 5,870,302 A | 2/1999 | Oliver | | |
| 5,901,961 A * | 5/1999 | Holland, III | ............. | G07C 1/22 273/445 |
| 5,946,643 A * | 8/1999 | Zakutin | ................ | A63B 43/00 702/142 |
| 6,198,243 B1 * | 3/2001 | Ritmanich | .......... | F24F 13/1426 318/466 |
| 6,298,285 B1 | 10/2001 | Addink et al. | | |
| 6,314,340 B1 | 11/2001 | Mecham et al. | | |
| 6,570,109 B2 * | 5/2003 | Klinefelter | ........... | A01G 25/167 200/61.04 |
| 6,581,009 B1 * | 6/2003 | Smith | ..................... | G01W 1/10 702/3 |

(Continued)

OTHER PUBLICATIONS

United States Patent and Trademark Office, Notice of Allowance dated Oct. 28, 2015 in U.S. Appl. No. 13/406,410, 7 pages.

(Continued)

*Primary Examiner* — Darrin D Dunn
(74) *Attorney, Agent, or Firm* — Inskeep IP Group, Inc.

(57) ABSTRACT

An irrigation control module is described that adjusts a watering schedule for a connected irrigation controller based on weather data provided by a local weather station. The irrigation control module can add additional weather-based irrigation schedule adjustments to an irrigation controller that may otherwise lack the hardware (e.g., wireless transmitter, sufficient memory) and software (e.g., evapotranspiration algorithms) to store and interpret weather data from a weather station.

6 Claims, 17 Drawing Sheets

(56) References Cited

U.S. PATENT DOCUMENTS

| | | | |
|---|---|---|---|
| 6,823,239 B2 | 11/2004 | Sieminski | |
| 6,892,145 B2* | 5/2005 | Topka | G06F 1/12 702/62 |
| 6,985,987 B2 | 1/2006 | Chang et al. | |
| 6,993,403 B1 | 1/2006 | Dadebo et al. | |
| 7,002,464 B2* | 2/2006 | Bruemmer | H04Q 9/00 340/309.16 |
| 7,005,977 B1 | 2/2006 | Tengler et al. | |
| 7,058,478 B2 | 6/2006 | Alexanian | |
| 7,066,021 B1* | 6/2006 | Noe | G01W 1/14 222/420 |
| 7,266,428 B2 | 9/2007 | Alexanian | |
| 7,322,230 B2* | 1/2008 | Noe | G01W 1/14 222/420 |
| 7,403,840 B2 | 7/2008 | Moore et al. | |
| 7,412,303 B1 | 8/2008 | Porter et al. | |
| 7,453,351 B2* | 11/2008 | Fitzgibbon | E05F 15/668 340/5.7 |
| 7,552,632 B2* | 6/2009 | Runge | A01G 25/167 73/170.16 |
| 7,596,429 B2* | 9/2009 | Cardinal | A01G 25/167 239/64 |
| 7,667,582 B1 | 2/2010 | Waldorf | |
| 7,733,595 B2* | 6/2010 | Lucas | G11B 19/043 360/69 |
| 7,844,368 B2 | 11/2010 | Alexanian | |
| 7,853,363 B1 | 12/2010 | Porter et al. | |
| 7,877,168 B1 | 1/2011 | Porter et al. | |
| 7,899,580 B2* | 3/2011 | Cardinal | A01G 25/167 700/284 |
| 7,962,244 B2 | 6/2011 | Alexanian | |
| 7,962,245 B2* | 6/2011 | Runge | A01G 25/167 239/69 |
| 7,966,153 B2* | 6/2011 | Bangalore | G01W 1/14 702/188 |
| 7,996,189 B2* | 8/2011 | Kaplan | H04W 24/08 702/182 |
| 8,271,198 B2* | 9/2012 | Teder | G01W 1/14 702/3 |
| 8,401,705 B2 | 3/2013 | Alexanian | |
| 8,407,072 B2 | 3/2013 | Cala et al. | |
| 8,457,003 B2 | 6/2013 | Yamada et al. | |
| 8,494,682 B2* | 7/2013 | Elmer | B05B 12/008 239/11 |
| 8,538,592 B2 | 9/2013 | Alexanian | |
| 8,620,480 B2 | 12/2013 | Alexanian | |
| 8,738,189 B2 | 5/2014 | Alexanian | |
| 8,744,773 B2* | 6/2014 | Woytowitz | G01W 1/14 324/204 |
| 8,818,758 B1 | 8/2014 | Singh et al. | |
| 8,862,275 B2* | 10/2014 | Runge | A01G 25/167 239/69 |
| 8,874,275 B2 | 10/2014 | Alexanian | |
| 8,912,877 B2* | 12/2014 | Ling | G06F 1/3203 340/3.1 |
| 9,655,311 B1* | 5/2017 | Bell | A01G 25/16 |
| 2002/0112682 A1* | 8/2002 | Koch | F01L 9/04 123/90.11 |
| 2002/0190855 A1* | 12/2002 | Bone | G08B 7/06 340/527 |
| 2003/0071522 A1* | 4/2003 | Baranowski | H01H 11/0062 307/116 |
| 2003/0078630 A1* | 4/2003 | Lovett | A61N 1/36514 607/27 |
| 2003/0079974 A1* | 5/2003 | Klinefelter | A01G 25/167 200/61.04 |
| 2003/0093159 A1 | 5/2003 | Sieminski | |
| 2003/0195902 A1* | 10/2003 | Schreiber | G06F 17/3061 |
| 2004/0025091 A1* | 2/2004 | Totman | G01N 3/066 714/47.1 |
| 2004/0138816 A1* | 7/2004 | Schutzbach | E03F 7/00 702/3 |
| 2004/0140903 A1* | 7/2004 | Buhler | A01G 25/167 340/602 |
| 2004/0181315 A1* | 9/2004 | Cardinal | A01G 25/167 700/284 |
| 2004/0257242 A1* | 12/2004 | Bruemmer | H04Q 9/00 340/870.14 |
| 2005/0246109 A1* | 11/2005 | Bang | G01P 13/00 702/41 |
| 2005/0251711 A1* | 11/2005 | Murphy | G01W 1/16 714/700 |
| 2005/0258949 A1* | 11/2005 | Iwazumi | B60C 23/0408 340/442 |
| 2006/0064267 A1* | 3/2006 | Sugiura | G01D 1/18 702/117 |
| 2006/0122735 A1 | 6/2006 | Goldberg et al. | |
| 2006/0191333 A1* | 8/2006 | Noe | G01W 1/14 73/170.17 |
| 2006/0202680 A1* | 9/2006 | Schmidt | F02D 41/009 324/207.12 |
| 2007/0195703 A1* | 8/2007 | Boyajian | G06F 19/3418 370/241 |
| 2008/0034859 A1* | 2/2008 | Runge | A01G 25/167 73/170.21 |
| 2008/0046803 A1 | 2/2008 | Beauchamp et al. | |
| 2008/0111001 A1* | 5/2008 | Elmer | A01G 25/16 239/11 |
| 2008/0294804 A1 | 11/2008 | Inage | |
| 2009/0006279 A1 | 1/2009 | Buettner et al. | |
| 2009/0009317 A1* | 1/2009 | Weaver | G06Q 10/06 340/517 |
| 2009/0079376 A1* | 3/2009 | Fitzgibbon | E05F 15/668 318/452 |
| 2009/0091371 A1* | 4/2009 | Bruwer | H05B 37/0227 327/398 |
| 2009/0099701 A1* | 4/2009 | Li | A01G 25/16 700/284 |
| 2009/0164168 A1* | 6/2009 | Korajda | G01D 5/24452 702/127 |
| 2009/0190443 A1 | 7/2009 | Huizi et al. | |
| 2009/0271044 A1* | 10/2009 | Bangalore | G01W 1/14 700/284 |
| 2009/0315733 A1* | 12/2009 | Bischoff | G06Q 50/22 340/659 |
| 2009/0325658 A1* | 12/2009 | Phelan | A01D 41/1275 460/6 |
| 2010/0010682 A1* | 1/2010 | Cardinal | A01G 25/167 700/284 |
| 2010/0030382 A1* | 2/2010 | Shalat | B25J 13/087 700/258 |
| 2010/0030476 A1* | 2/2010 | Woytowitz | A01G 25/16 702/3 |
| 2010/0036624 A1* | 2/2010 | Martin | G01R 22/10 702/61 |
| 2010/0045461 A1* | 2/2010 | Caler | G08B 25/008 340/541 |
| 2010/0103103 A1* | 4/2010 | Palanker | G06F 3/023 345/158 |
| 2010/0214103 A1* | 8/2010 | Egan | G06F 19/3418 340/573.1 |
| 2010/0248639 A1* | 9/2010 | Ryu | H04L 12/2825 455/67.11 |
| 2011/0004435 A1* | 1/2011 | Lindstrom | G08B 21/043 702/138 |
| 2011/0004914 A1 | 1/2011 | Ennis, Jr. et al. | |
| 2011/0043481 A1* | 2/2011 | Bruwer | H05B 37/02 345/174 |
| 2011/0054794 A1* | 3/2011 | Teder | G01N 21/552 702/3 |
| 2011/0077785 A1 | 3/2011 | Nickerson et al. | |
| 2011/0125525 A1 | 5/2011 | Lung et al. | |
| 2011/0148801 A1 | 6/2011 | Bateman et al. | |
| 2011/0159385 A1* | 6/2011 | Tanaka | C01B 3/08 429/416 |
| 2011/0169638 A1* | 7/2011 | Krumhansl | G01V 1/001 340/566 |

(56) References Cited

U.S. PATENT DOCUMENTS

| | | | |
|---|---|---|---|
| 2011/0170224 A1* | 7/2011 | Gietler | H01F 7/1844 361/139 |
| 2011/0238228 A1* | 9/2011 | Woytowitz | A01G 25/16 700/284 |
| 2011/0288775 A1* | 11/2011 | Woytowitz | G01W 1/14 702/3 |
| 2012/0016497 A1 | 1/2012 | Marsters et al. | |
| 2012/0053917 A1* | 3/2012 | McHenry | G06F 17/5009 703/9 |
| 2012/0192965 A1* | 8/2012 | Popper | E03B 7/04 137/357 |
| 2012/0203382 A1* | 8/2012 | Nourian | A01G 25/16 700/284 |
| 2012/0212437 A1* | 8/2012 | Kobayashi | G06F 1/1624 345/173 |
| 2012/0215366 A1* | 8/2012 | Redmond | A01G 25/167 700/284 |
| 2012/0229284 A1* | 9/2012 | Hern | A01G 25/167 340/618 |
| 2012/0239211 A1 | 9/2012 | Walker et al. | |
| 2014/0088771 A1 | 3/2014 | Woytowitz et al. | |
| 2014/0245208 A1 | 8/2014 | Javey et al. | |
| 2015/0112494 A1* | 4/2015 | Woytowitz | A01G 25/167 700/284 |
| 2017/0038497 A1* | 2/2017 | Hern | A01G 25/167 |
| 2018/0135879 A1* | 5/2018 | Ota | F24F 11/74 |

OTHER PUBLICATIONS

United States Patent and Trademark Office, Office Action dated Apr. 24, 2015 in U.S. Appl. No. 13/406,410, 31 pages.

United States Patent and Trademark Office, Final Office Action dated Dec. 16, 2014 in U.S. Appl. No. 13/406,410, 38 pages.

United States Patent and Trademark Office, Office Action dated Jul. 31, 2104 in U.S. Appl. No. 13/406,410, 19 pages.

* cited by examiner

IRRIGATION CONTROLLER WITH WEATHER STATION

RELATED APPLICATIONS

This application is a continuation of U.S. patent application Ser. No. 13/406,410 filed Feb. 27, 2012 entitled Irrigation Controller With Weather Station, which claims priority to U.S. Provisional Application Ser. No. 61/446,872 filed Feb. 25, 2011 entitled Irrigation Controller with Weather Station, which is hereby incorporated herein by reference in its entirety.

BACKGROUND OF THE INVENTION

Many residences or commercial sites have irrigation controllers that allow a user to schedule irrigation of their lawn at specific times. Many irrigation controllers allow for the connection of a rain sensor that interrupts watering during rain. However, these controllers are typically unable to adjust their schedules based on more sophisticated weather data. Therefore, irrigation controllers tend to over water turf during wet weather and under water turf during hot weather.

SUMMARY OF THE INVENTION

One embodiment of the present invention is directed to an irrigation control unit that adjusts a device operation schedule (e.g., a watering schedule for sprinklers or a lighting schedule for outdoor lights) for a connected irrigation controller. The control unit receives and stores weather data provided by a local weather station and, based on this data, sends irrigation schedule adjustments to the main irrigation controller. In this respect, the control module can add additional weather-based irrigation schedule adjustments to an irrigation controller that may otherwise lack the necessary hardware (e.g., wireless transmitter, sufficient memory) and/or software (e.g., evapotranspiration algorithms) to store and interpret weather data from a weather station.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
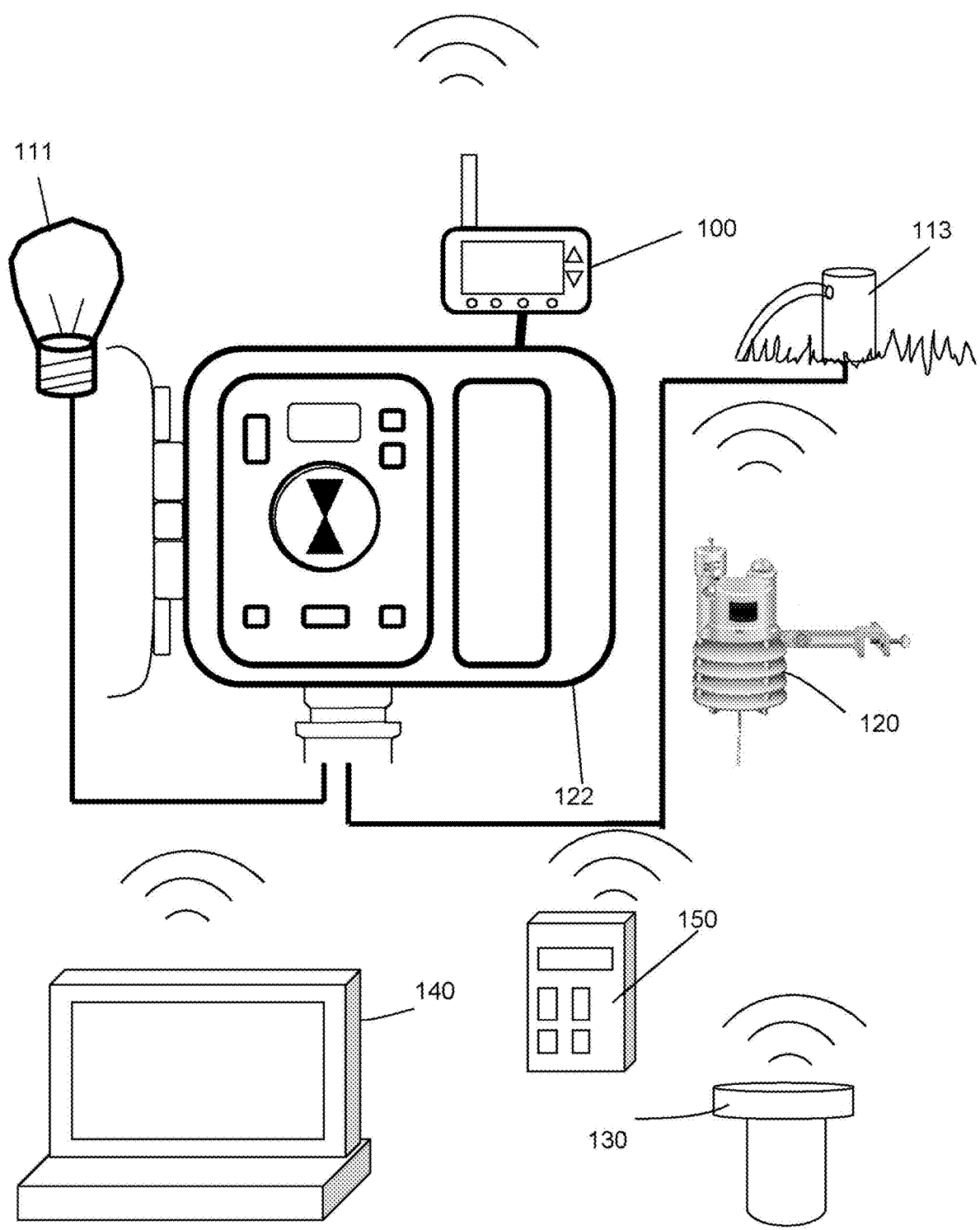
FIG. 1 illustrates an irrigation control module according to the present invention that is connected to an irrigation controller.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIG. 1 illustrates an irrigation control module 100 according to the present invention that adjusts a watering schedule for a connected irrigation controller 122 based on weather data provided by a local weather station 120. The irrigation control module 100 can add additional weather-based irrigation schedule adjustments to an irrigation controller that may otherwise lack the hardware (e.g., wireless transmitter, sufficient memory) and/or software (e.g., evapotranspiration algorithms) to store and interpret weather data from a weather station.

Figure 2:
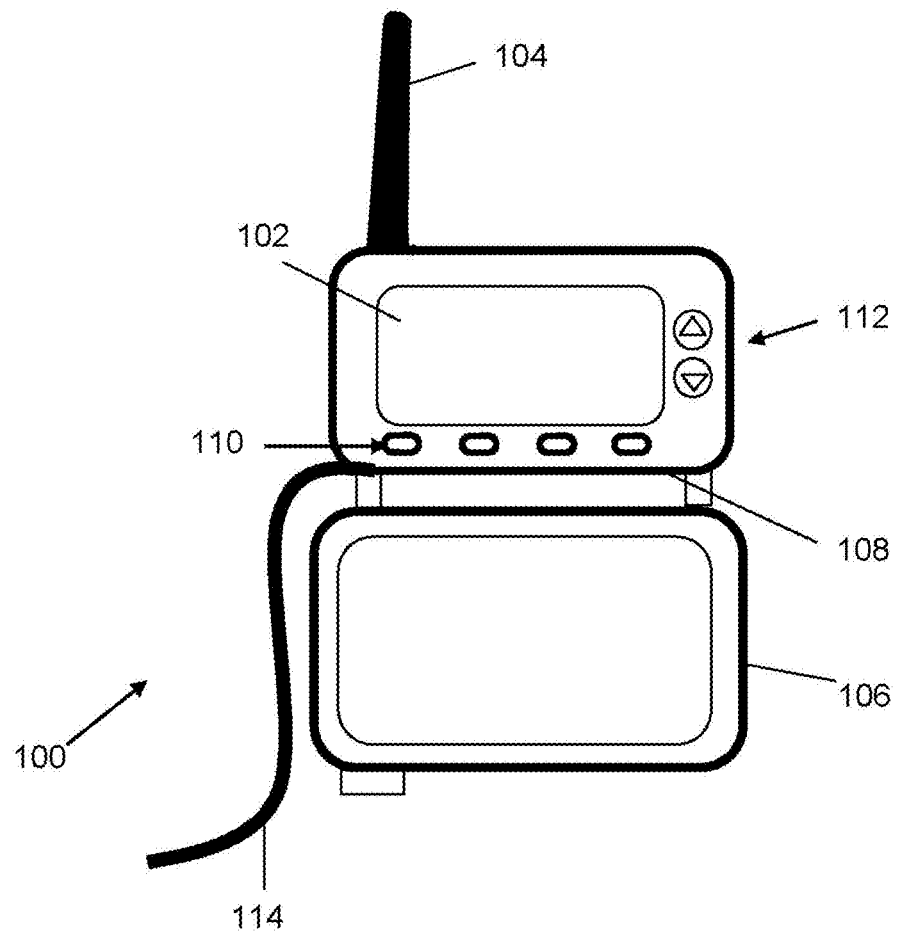
FIG. 2 illustrates the irrigation control module of FIG. 1.

As seen in the example embodiment of FIG. 2, the irrigation control module 100 is composed of an outer housing 103 that contains the electrical circuitry or components such as a microprocessor or microcontroller, memory and wireless transceiver. A display 102 (e.g., LCD) is exposed on the front side of the module 100 for displaying information to the user, while interface buttons 110 and 112 allow for interaction with software of the module 100. A front cover 106 is attached by hinges at the bottom region of the module 100 for selective opening and closing over the front side of the module 100.

Preferably, the module 100 includes a wireless radio antenna 104 that is coupled to a transceiver circuit inside the housing 103. This antenna 104 and transceiver create a remote device communication link that allows for wireless communication with one or more weather stations 120, soil moisture sensors 130, remote controls 150 and/or computers 140 (see FIG. 1). In this respect, the module 100 can receive weather data from the weather station 120 or computer 140, soil moisture data from the soil sensor 130, and programming data from the computer 140 and/or remote control 150. Further, each of these devices can each be associated with individual device stations (e.g., irrigation stations) of the irrigation controller 122, allowing more individual feedback from each irrigation station, especially from soil moisture sensors 130 or weather stations 120. While wireless radio communication is preferred, any wired (e.g., wires) or wireless (e.g., infrared) communication mechanism can alternately be used.

The module 100 generally connects to an irrigation controller 122 via a communication link. In one example, this communication link can be a control wire 114 that connects to an output port external exposed through the module's housing. This output port is in communication with the electrical components of the module 100, such as the processor or microcontroller. Preferably the control wire 114 connects via a communications port in the irrigation controller (e.g., an RJ-45 connector). In another example, the communication link is a wireless interface for sending and receiving data between the module 100 and irrigation controller 122 (e.g., wireless transmitters and antenna).

The module 100 determines schedule adjustments such as increases, decreases or interruptions to a device station's operational schedule (e.g., an irrigation station's irrigation schedule). Schedule adjustment commands are determined based on factors discussed in more detail below and are transmitted over the communication link with the controller 122 (e.g., wire 114). For example, a schedule adjustment command may instruct the controller 122 to increase/decrease a sprinkler's runtime by a percentage, modify a sprinkler's start or finish time, or simply interrupt a sprinkler from operating. Similar adjustments can be made for a controlled light.

Figure 3:
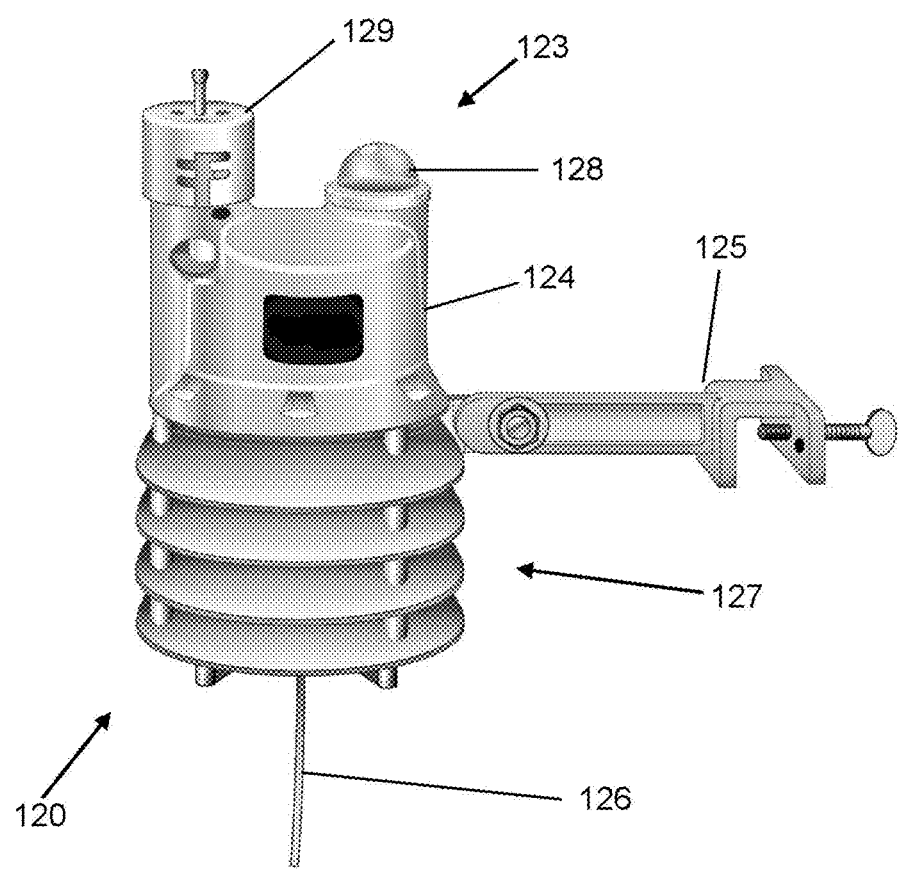
FIG. 3 illustrates a wireless weather station according to the present invention.

As seen in FIG. 3, the wireless weather station 120 comprises an adjustable rain sensor 129 for measuring precipitation, a solar sensor 123 for sensing solar radiation and a temperature sensor 127 for sensing temperature. This weather data can be transmitted via a wireless transceiver and antenna 126 for processing and use by the module 100.

In the present example, the rain sensor 129 is composed of hygroscopic material that expands when contacted with moisture. This hygroscopic material can expand against a single "on/off" switch or can move a position-sensitive sliding sensor to produce a variable data reading. Alternately, the rain sensor 129 may comprise a "tipping bucket" style sensor that senses when a bucket tips as it fills with rain.

The solar sensor 123 is preferably composed of a diffuse or semi-opaque solar dome 128 and a light sensor. Many prior art solar sensors include a clear dome positioned over a light sensor. Since these prior art solar sensors are susceptible to inaccurate readings due to dirt buildup on the dome and low angle light (e.g., light during mornings or evenings) since they are calibrated for light readings under a clear dome.

In contrast, the solar sensor 123 is calibrated for the diffuse solar dome 128 and therefore accumulation of dirt on the dome 128 affects light readings to a smaller degree. Additionally, when lower angle light (i.e., light that is not directly overhead) strikes the dome 128, it causes the dome 128 to light up instead of passing directly through the clear, prior art domes. In this respect, the solar sensor 123 can sense and account for more low-angle light and therefore more accurately determine water needs.

The lower, slotted portion of the weather station 120 preferably includes the temperature sensor 127, which allows the free flow of air into the station 120. The upper portion 124 of the station 120 preferably includes a battery compartment that houses a battery to power the station 120.

Figure 4:
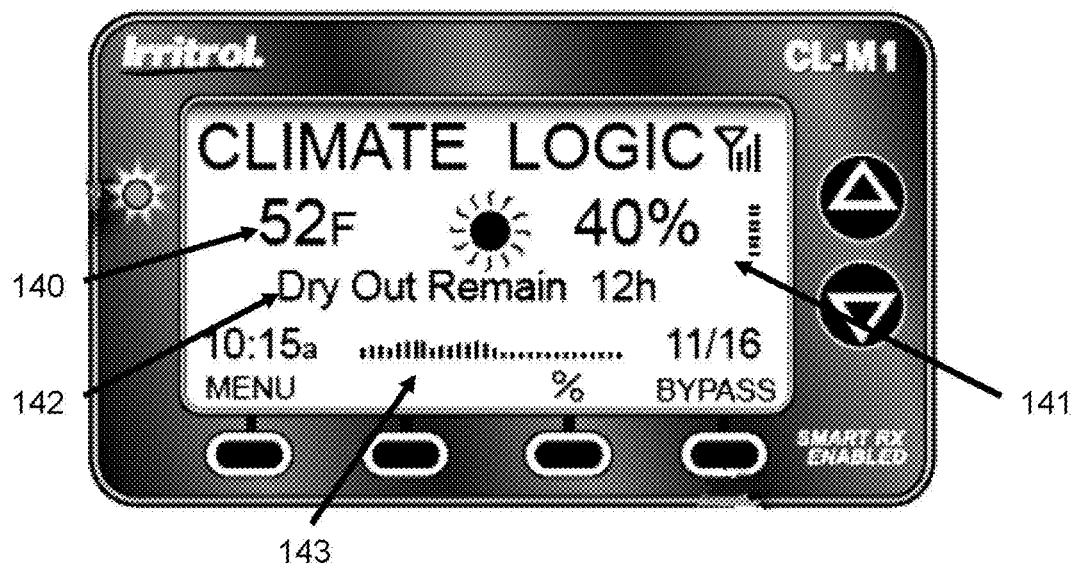
FIGS. 4-19 illustrate various interface display screens of the irrigation control module of FIG. 1.

FIG. 4 illustrates an example of a main or default interface display according to the present invention that is typically displayed after setting up the module 100 with the weather station 120 and during normal operation. A temperature display 140 shows 52 degrees Fahrenheit, the irrigation schedule percentage adjustment display 141 is set to 40% and the current activity status reads "Dry Out Remain 12 h". The time and date are also shown and are preferably automatically requested and downloaded by the module 100 from the irrigation controller 122.

The default interface display also preferably includes a water history display 143. The display 143 preferably displays the percentage that the module 100 has adjusted the irrigation schedule of the irrigation controller 122 in a chart or graph form. In the example shown, the display 143 shows a plurality of bars, each of which represents a predetermined length of time (e.g., one day) and which has a height that corresponds to or is relative to the percentage that the irrigation schedule was adjusted. Hence, the user can view this display 143 to determine a rough, relative estimate of how the module 100 has adjusted the irrigation schedule in the recent past.

Figure 5:
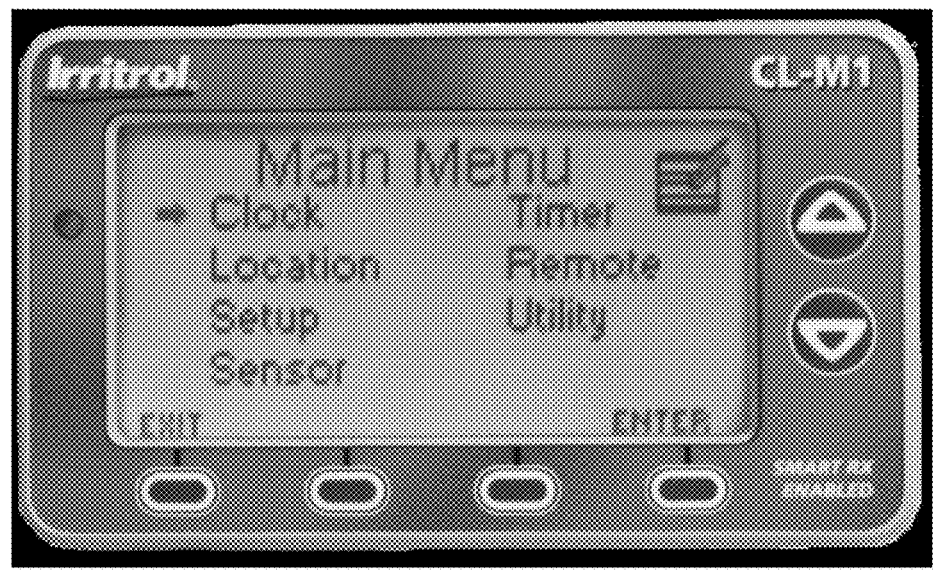

The lower portion of the display 102 shows various labels for the interface buttons 110, such as "Menu", "Espanol" and "%". Pressing the menu button 110 brings up the menu shown in FIG. 5, which includes "Clock", "Location", "Setup", "Sensor", "Timer", "Remote" and "Utility".

Figure 6:
Figure 7:

FIG. 6 illustrates the clock interface screen that allows a user to manually modify the date and time for the module 100. While the time can be manually set, the module 100 may also interface with a computer or other device to automatically obtain the current date and time. FIG. 7 illustrates the Timer interface screen, which allows a user to manually specify the type of irrigation controller 122 the module 100 is connected to. This allows the module 100 to use the proper communication protocol understood by a particular irrigation controller 122.

Figure 8:

The module 100 allows the user to input the location of the module 100. For example, the location can be inputted as latitude and longitude coordinates as seen in the location coordinate input interface element of FIG. 8 or as a zip code (or similar postal code as used in other countries) as seen in the zip code input interface element of FIG. 9. Alternately, the module 100 may include a GPS receiver chip for automatically detecting location (e.g., latitude, longitude) or can communicate with another device, such as a computer or cell phone which detects and supplies location data (e.g., zip code or lat/long coordinates).

With both the geographic location and time of year information, the module 100 can more accurately measure and determine solar radiation data and therefore make a more accurate estimation of water loss (e.g., evapotranspiration) that can be used to adjust a watering schedule. For example, the northern U.S. tends to receive a higher percentage of low angle light during winter months as compared with the southern U.S. or southern portions of North America. In this example, the low angle winter sunlight of the northern U.S. may register a lower radiation value than many plants may actually receive. This example radiation data can be increased proportionately to account for this low angle winter sunlight and thereby provide more accurate solar radiation values.

Additionally, sunrise and sunset times can be more accurately determined via zip code and a current date/time, which can further increase solar radiation accuracy. For example, these sunrise and sunset times may determine a window of solar radiation monitoring, thereby preventing the measured radiation from becoming skewed by artificial lights (e.g., the outdoor lights on a house).

Figure 9:

Preferably, when the user enters their zip code into the zip code interface element of FIG. 9 the module 100 looks up a zip code in a postal code database (either stored on the memory card 107 or from the internet via the computer 140). This database may include data that allows calculation of various solar radiation adjustments based on the current date (e.g., sunrise, sunset, radiation adjustment factors for certain times of day, and latitude/longitude coordinates). Alternately, the database may simply store this relevant and corresponding data for each zip code and day of the year, eliminating the need for on-the-fly calculations. This database can similarly be used to lookup corresponding data based on inputting latitude/longitude coordinates inputted via the interface shown in FIG. 8.

Some of the inaccuracy for solar radiation measurement also relates to the solar sensor 123. As previously described, solar sensors with light sensors positioned beneath clear domes tend to provide less accurate (e.g., lower) solar radiation values for sunlight shining at low angles.

Figure 10:
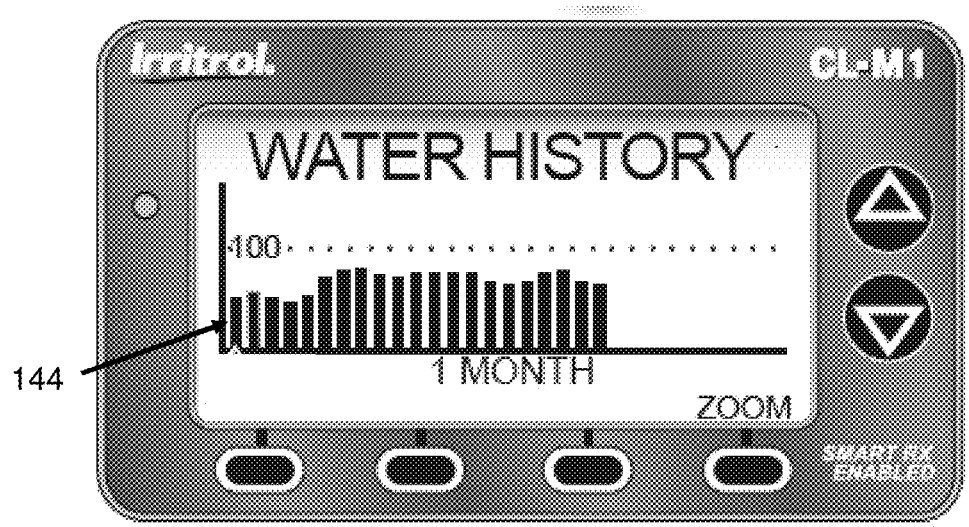

FIG. 10 illustrates the water history display screen which illustrates the amount (e.g., percentage) the module 100 has adjusted the irrigation schedule of the controller 122. Preferably, the history display is a chart or graph. In the example of FIG. 10, the history display provides a plurality of vertical bars 144, each of which represents a quantity of time. The length or height of each bar represents the percentage that the irrigation schedule was adjusted relative to a horizontal "100%" indicator (i.e., which indicates no schedule change). This allows the user to visualize how much adjustment has occurred over a specific period of time, such as over one month, as displayed at the bottom of this display. The zoom interface button (i.e., the button immediately below the "zoom" text) allows a user to narrow the range of time shown, effectively zooming in on the graph. In an alternate example, the history display can be a line that connects horizontal data points.

Figure 15:
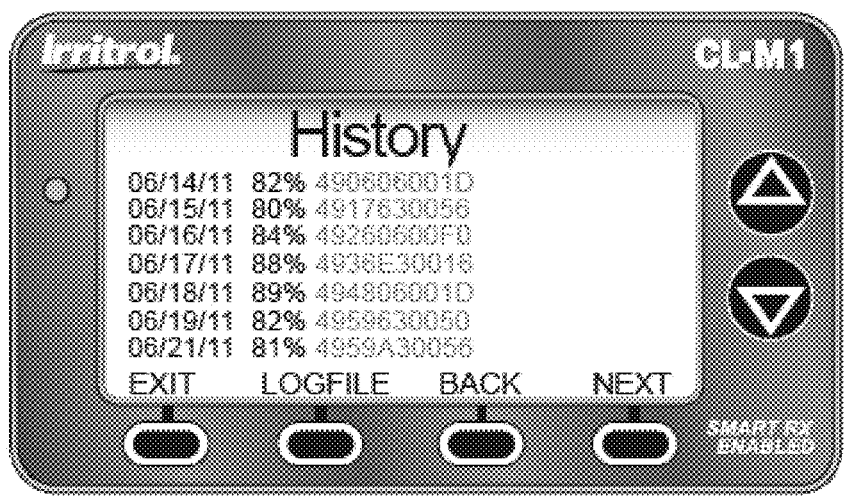

The watering history adjustment can be displayed in text form as seen in FIG. 15. This text history displays the date (e.g., month, day year) and the water percentage adjustment (e.g., the percentage change from the original schedule) as determined by the module's weather calculations.

Figure 11:
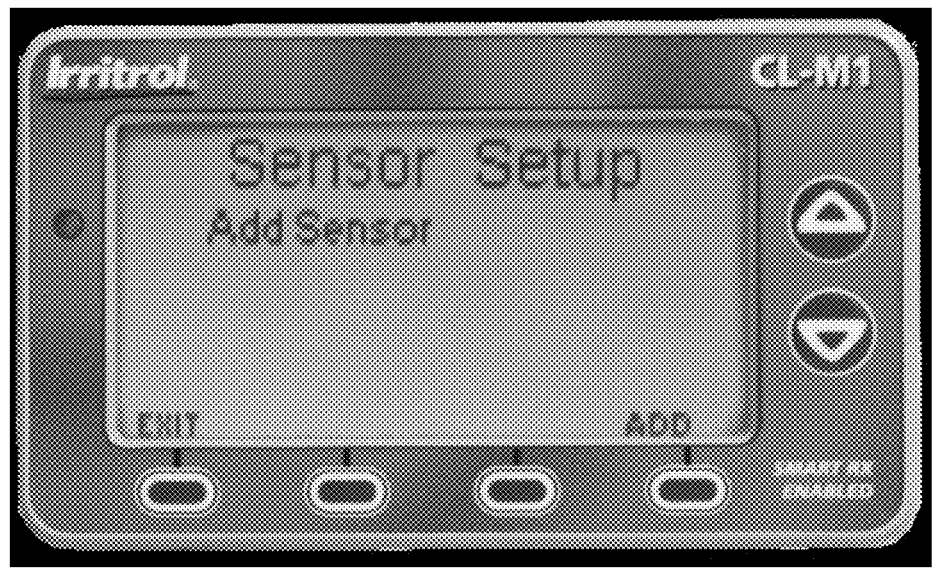
Figure 12:
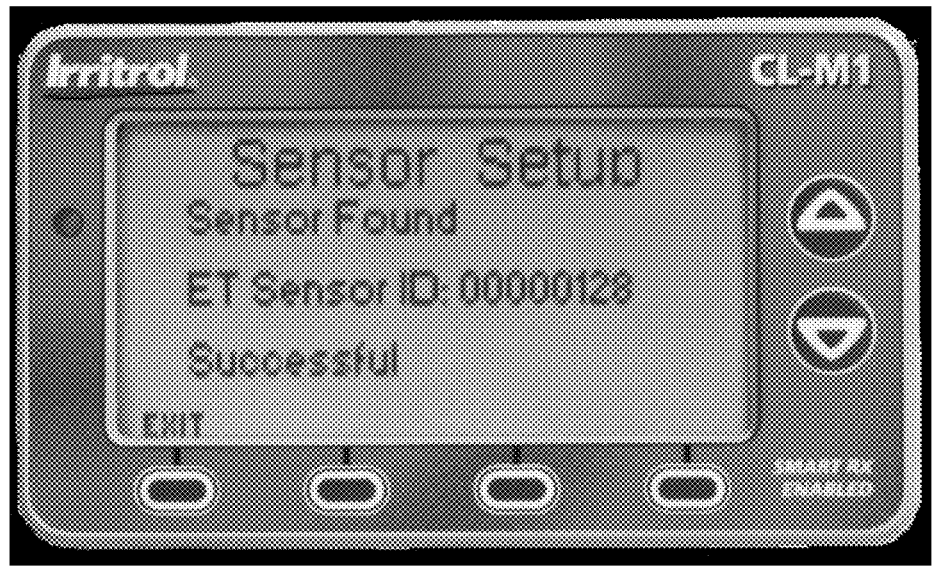

A weather station 120 (or other device) can be manually added if automatic pairing or registering with the module 100 does not occur, or if a user wishes to add a new or replacement weather station. As seen in FIG. 11, a sensor setup screen allows a new weather station 120 to be registered. When the add button is pressed, the module 100 searches (e.g., wirelessly searches) for a new station 120. If a new station 120 is found, its sensor ID is displayed as seen in FIG. 12. The station 120 is then registered with the module 100, allowing the module 100 to regularly obtain data as needed. Registered weather stations 120 can also be removed as a registered weather data source by a similar interface which allows the user to view the station's ID and confirm removal.

Figure 13:
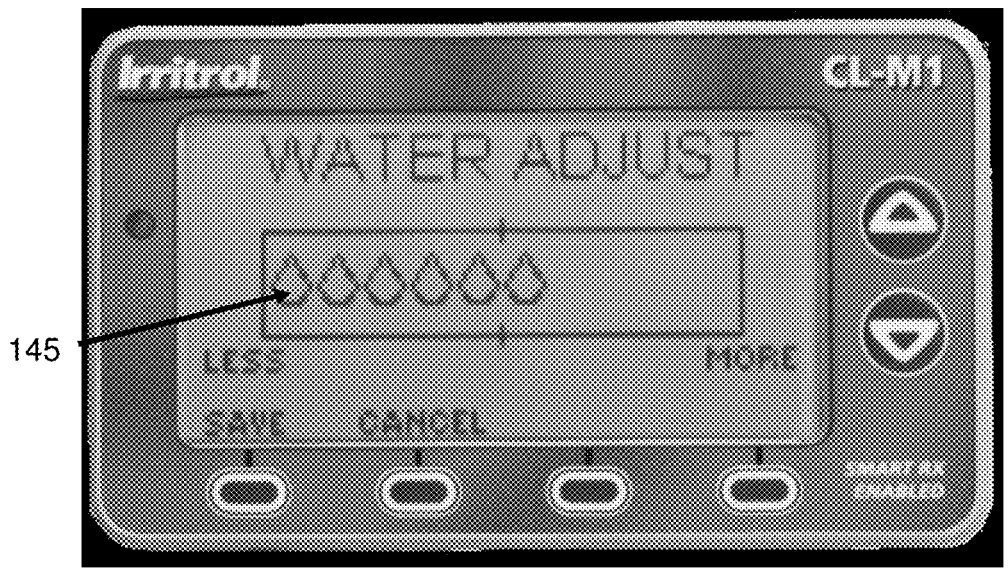

If the user finds that their turf is a little too dry or a little too wet, the user interface arrows 112 can be depressed when on the main screen (shown in FIG. 2) to bring up a system-wide water adjustment screen for all zones. As seen in FIG. 13, the water adjustment screen displays a box with a plurality of water drops elements 145 that represent the amount of water currently irrigated. The arrows 112 can add or remove the water drops, which cause the module 100 to increase or decrease all watering times by either a predetermined time or percentage. In this respect, the module 100 causes more or less water to be delivered to user's turf.

Figure 14:
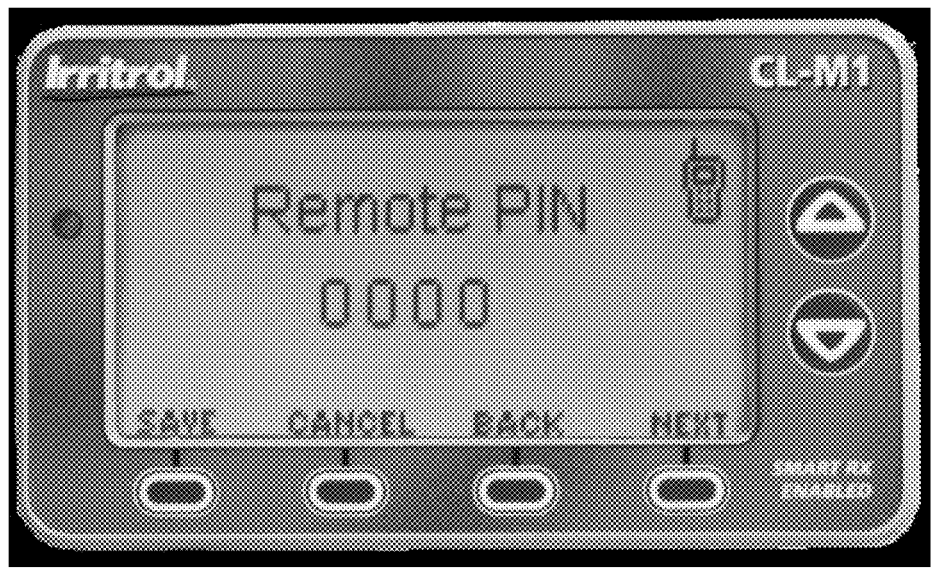

The module 100 preferably includes a security or PIN code that must be entered by a user using remote 150. As seen in FIG. 14, the remote security code can be set by increasing or decreasing at least four numbers to a desired value, then saving that code. The user then enters that code on the remote control 150 to allow control of the module 100 via the remote control 150.

Figure 17:
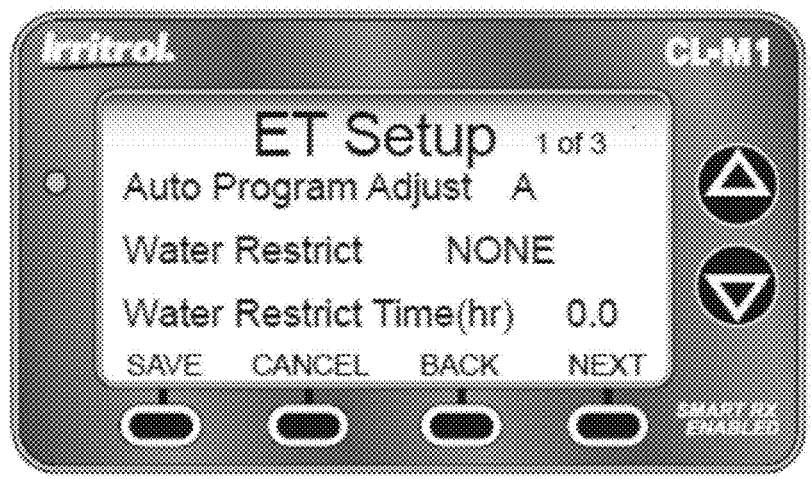
Figure 18:
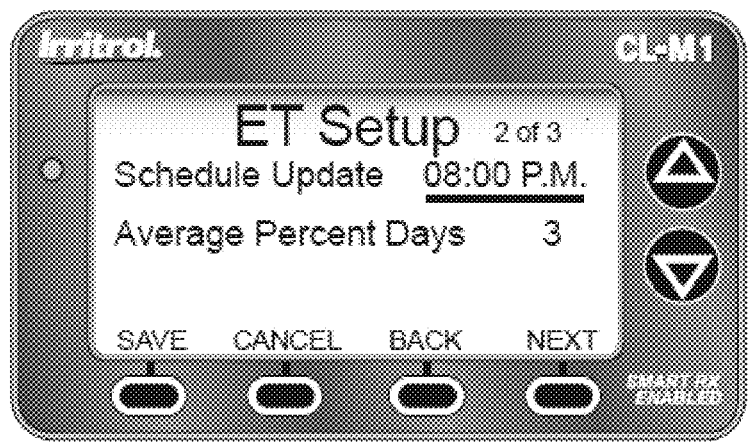
Figure 19:
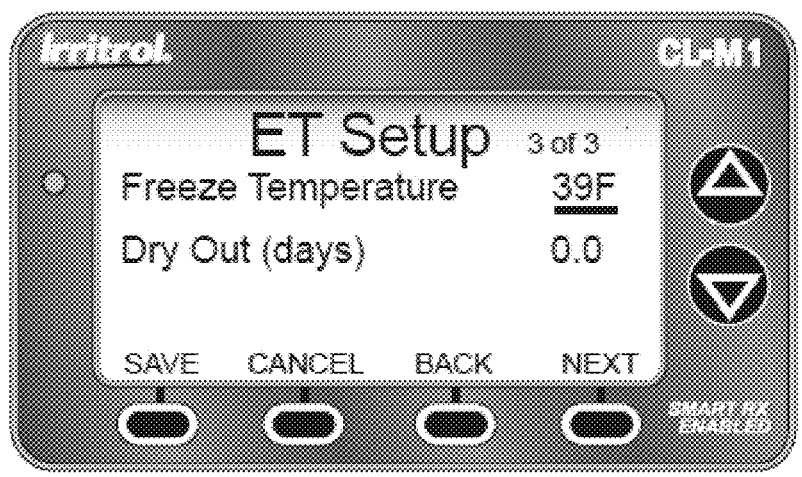

FIGS. 17-19 show several interface displays for setting up several evapotranspiration (ET) functions of the module 100. In FIG. 17 a user can specify restrictions for irrigation stations assigned to different programs, such as program "A" (shown in this Figure), Program B, or Program C. The "Water Restrict" interface element allows a user to specify if watering restriction times should be enabled (this feature is set to "None" or turned off in the Figure). When the "Water Restrict" is activated, the user can also set which hours of the day should be restricted (e.g., in 24 hour time) via the "Water Restrict Time" interface element.

FIG. 18 shows a second ET setup interface that allows the user to determine a time of day to obtain updates from its weather source (e.g., weather station, soil sensor, computer, etc.) via the "Schedule Update" interface element. Additionally, the "Average Percent Days" interface element allows a user to determine how many days of compiled weather data are used to calculate the current watering adjustment % factor. For example, this interface element can be set to average 1 to 7 days such that a higher number of days averaged typically results in less adjustment variation while a lower number of days averaged typically results in more adjustment variation.

Figure 16:
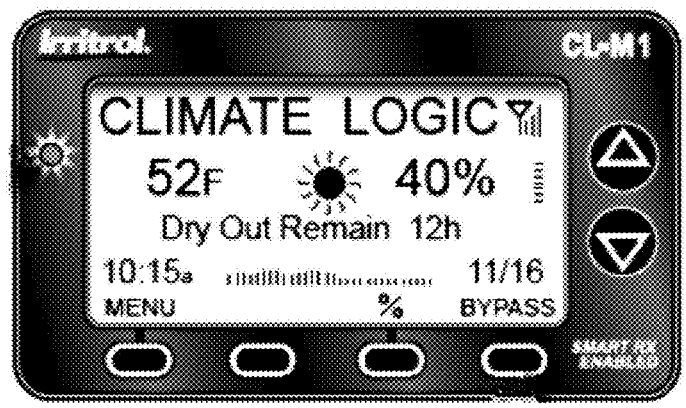

FIG. 19 shows a third ET setup interface that includes a "Freeze Temperature" interface element and a "Dry Out" interface element. The "Freeze Temperature" interface element allows the user to determine the temperature threshold below which irrigation should be halted for assigned program (e.g., Program A). The "Dry Out" interface element determines the minimum amount of time that must elapse after the release of a rain or temperature interruption before automatic watering can occur (i.e., before the module 100 stops interrupting the controller's irrigation schedule). When the module 100 is in this dry out mode, it preferably provides a status update on the default interface screen, as seen in FIG. 16, communicating to the user how much time remains in the dry out period.

Figure 20:
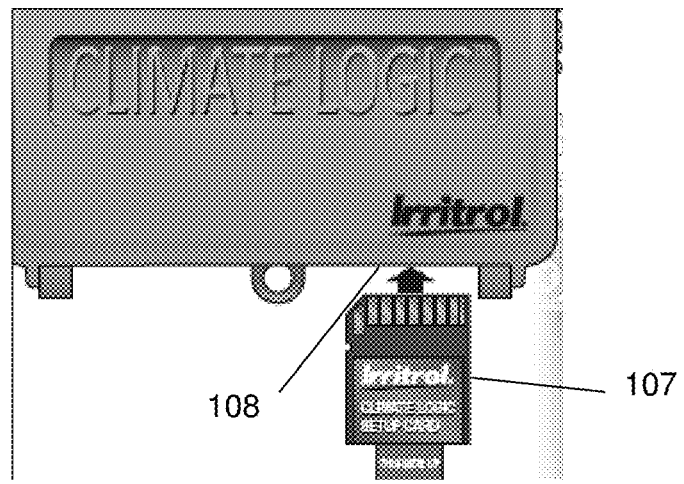
FIGS. 20 and 21 illustrate the insertion of a memory card into the irrigation control module of FIG. 1.
Figure 21:
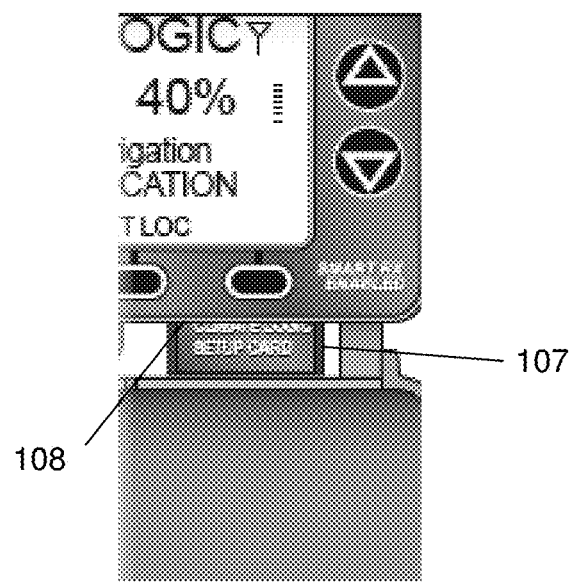
Figure 24:
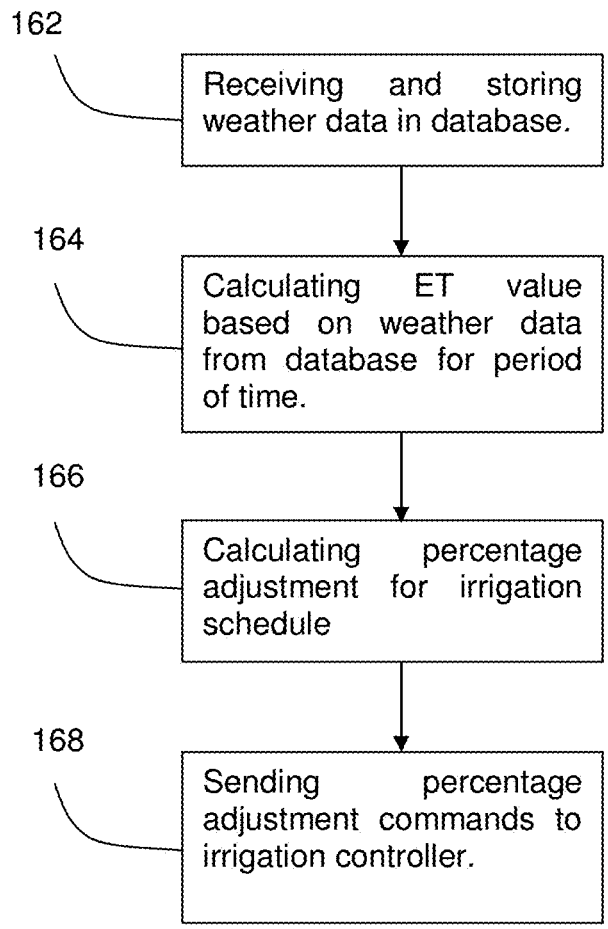
FIG. 24 illustrates a flow chart for adjusting an irrigation schedule according to the present invention.

An operational flow chart can be seen in FIG. 24, illustrating the general operations of the module 100. In step 162, the module 100 receives and stores weather data in a weather database and then calculates an ET value in step 164 for a specific period of time (e.g., a day or week). Preferably all weather data obtained from the weather station 120 is stored in the database (e.g., solar radiation, rainfall, wind, etc.), as well as a calculated ET value for that day. Alternately, only the ET value for each day can be calculated and stored in the database to minimize database size. Preferably, the database is stored on a removable memory card 107 that fits within memory card slot 108 (see FIGS. 20 and 21), allowing the user to upgrade to larger storage sizes as needed or preload historic weather or ET data.

In step 166, a software routine in the module 100 calculates a percentage adjustment to the watering time of the irrigation schedule based on the calculated ET value. For example, the percentage adjustment can be based on the change in ET from the previous day or from a baseline ET value. Alternately, the runtime of the irrigation schedule can be modified if a controller does not support adjustment by percentage. This percentage adjustment also includes any user-specified increases as described with regard to FIG. 13.

Once the desired percentage adjust is calculated, a software routine in the module 100 determines and transmits the desired percentage adjustment command to the irrigation controller 122. Different percentage adjustment commands may be necessary for different models of irrigation controllers 122, depending on their functionality and programming.

If a wireless soil moisture sensor 130 is also connected to the module 100, the soil moisture value can be used to further adjust the irrigation controller 122. For example, the module 100 can interrupt irrigation when moisture values rise above a determined threshold. In another example, the percentage adjustment value can be calculated based on weather values (e.g., to calculate an ET value for the general geographic area) and the soil moisture level.

Additionally, multiple soil moisture sensors 130 can be used and associated with each irrigation station of the irrigation controller 122. In this respect, the module 100 can record soil moisture data for multiple irrigation zones and adjust irrigation for each of those zones individually (e.g., based on ET and soil moisture).

Figure 25:
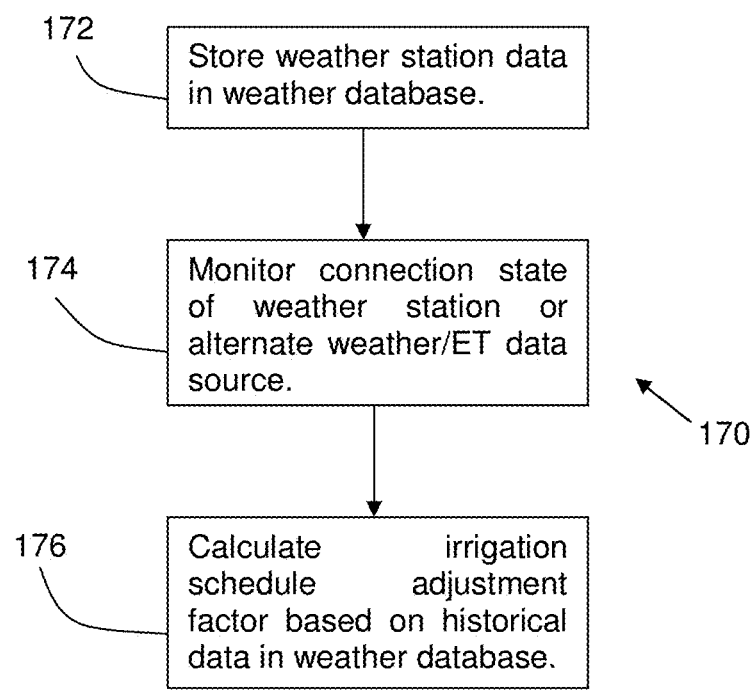
FIG. 25 illustrates a flow chart for using historical weather data to calculate a change in an irrigation schedule.

As seen in FIG. 25, the module 100 can include a historical fail-safe software routine 170 that provides a backup ET value in case the weather station 120 is no longer connected (e.g., damage, dead battery). In step 172, the software routine 170 stores the weather data from the weather station 120 in the weather database.

In step 174, the routine 170 monitors the connection state of the weather station 120. When the weather station 120 becomes unavailable, the routine searches for an alternate source of ET values, such as via a connection to a real-time weather/ET data source on the internet. If no alternate data source can be found, the routine 170 uses the historic data from the weather database. Preferably, the database can store historic data for at least several years (e.g., via the removable memory card 107), allowing the routine to average a historic ET value for a specific day and therefore increase accuracy. Hence, the accuracy of the historical database can improve over several years of use. The historical database may also be sold preloaded with historical ET data for a specific geographic region or the user can load or download historic data from an internet source to further increase accuracy (e.g., copy the downloaded historic ET database to the removable memory card in slot 108).

In step 176 the module 100 calculates a percentage adjustment to the irrigation schedule of the connected irrigation controller 122 based on the historic ET values of the historical database and based on any user-defined adjustments. The module 100 then communicates with the irrigation controller 122 to communicate the calculated percentage adjustment.

Figure 26:
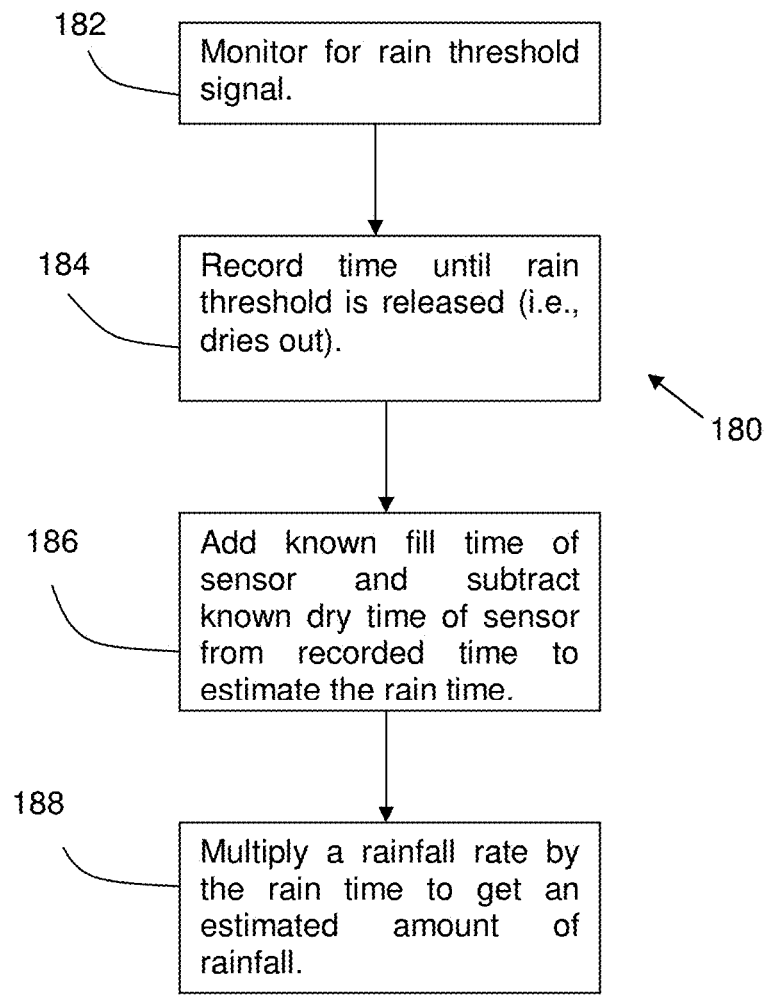
FIG. 26 illustrates a flow chart for a rainfall estimation software routine for a hygroscopic rain sensor; and, FIG. 27 illustrates a flow chart for controlling a lighting schedule based on sunrise and sunset times of a specific geographic location.

The module 100 also preferably includes a rain estimation algorithm 180 (FIG. 26) that allows an amount of rainfall to be estimated based on measurements from the hygroscopic rain sensor 129 on the weather station 120. In step 182, the algorithm 180 monitors for a rain signal or a rain threshold trigger from the hygroscopic rain sensor 129 and records the amount of time until that signal or threshold is released in step 184.

In step 186, the recorded rain signal time is preferably adjusted to more accurately determine the actual rain time. For example, a hygroscopic sensor must first saturate with water and expand in order to trigger its threshold switch. This saturation time can be estimated and added on to the recorded rain signal time. Alternately, it may be known that the hygroscopic sensor triggers after a certain amount of rainfall (e.g., ¼"). This amount can be added to the final fall amount.

In another example, the dry out time for the hygroscopic sensor may also be known. This dry out time can be subtracted from the recorded rain signal time. Thus, the end time of the rain can be better estimated. The dry out time can be further adjusted based on readings from the solar radiation sensor 123 (e.g., as solar radiation increase, dry out time proportionately decreases).

In step 188, a rate of rainfall is multiplied by the adjusted rain signal time to determine the estimated amount of rainfall. The rate can be a predetermined average rainfall rate, an average rainfall rate for a particular geographic area, an average rainfall rate for a geographic area during a known time of the year, or a rainfall rate obtained via a computer/internet data source. This final estimated rainfall amount can also be used by the module 100 to calculate an ET value and adjust the watering time of the irrigation controller 122 (e.g., via a percent adjust).

Figure 22:
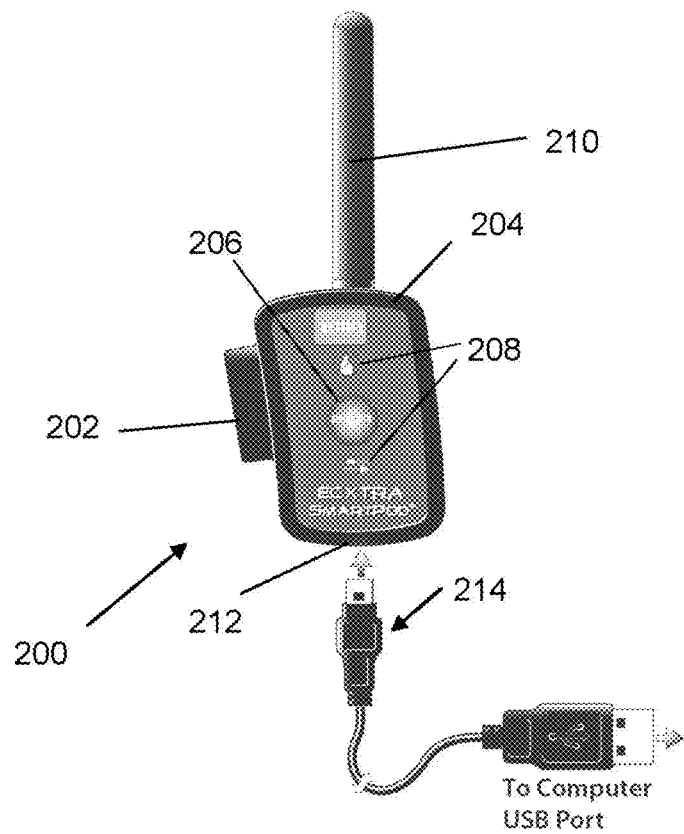
FIGS. 22, 23A and 23B illustrate an alternative embodiment of an irrigation control module.
Figures 23A, 23B:
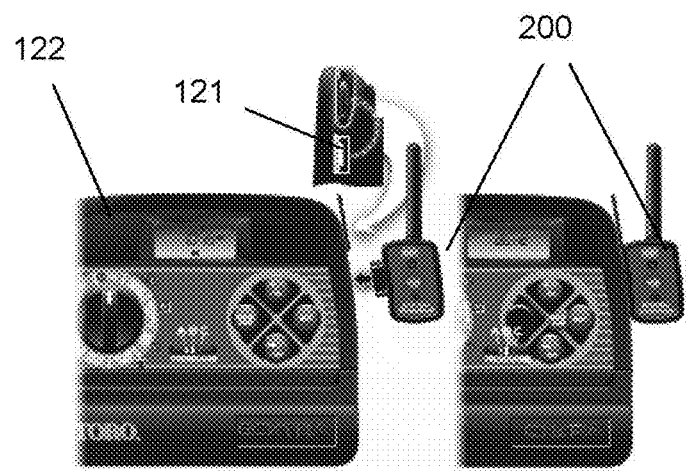

FIGS. 22, 23A and 23B illustrate an alternate embodiment of a module 200 that can directly connect to an irrigation controller 122. Specifically, the housing 204 of module 200 includes a controller interface port 202 that plugs directly into a module interface port 121 on the controller 122, as seen in FIGS. 23A and 23B.

Once connected to the controller 122, the module 200 acts generally similar to the previously described module 100. For example, the module 200 wirelessly communicates with the weather station 120 via a transceiver connected to antenna 210. The module 200 stores the received weather data in a weather database which is used to calculate an ET value and an irrigation schedule adjustment (e.g., percentage runtime adjustment or irrigation time adjustment). The housing includes an interface button 206 and indicator lights 208 for interacting with the module 200.

A computer data port 212 (e.g., USB port) is located at a bottom end of the module 200, allowing a data cord 214 to selectively connect to a computer. In this respect, a user can remove the module 200, and then connect it via the data port 212 to a computer for programming. Preferably, irrigation software can be loaded onto the computer to facilitate modifying settings of the module 200, the irrigation schedule of the controller 122 or adding new weather data to memory in the module 200.

Preferably, the firmware for module 100 or module 200 can be updated by downloading a new firmware file onto either the memory card 107 or via the data port 212, respectively.

In another aspect of the present invention, the module 100 or 200 can also control outdoor lighting. In one example, one irrigation station control of the irrigation controller 122 is connected to control a lighting system or a set of lights 111, in addition to controlling a sprinkler 113, as seen in FIG. 1. The module 100, 200 can be configured by the user to specify that a particular irrigation station of the controller 122 controls lighting, allowing the module 100, 200 to control or adjust lighting needs. Alternately, the module 100, 200 may be in wireless communication with a separate light controller that is directly connected to the user's outdoor lights.

The module 100, 200 can control the lights based on a predetermined light level threshold determined via a light level threshold interface and measured via the solar sensor 123. For example, if the ambient outdoor light falls below a certain number of lumens, the module 100, 200 adjusts a lighting schedule or otherwise sends a "light on" command to turn on the lights. The light level threshold can be used to both turn on and turn off outdoor lights, or the threshold can be used to only turn on or only turn off the lights (e.g., to turn on lights earlier than scheduled if it is darker than usual).

Figure 27:
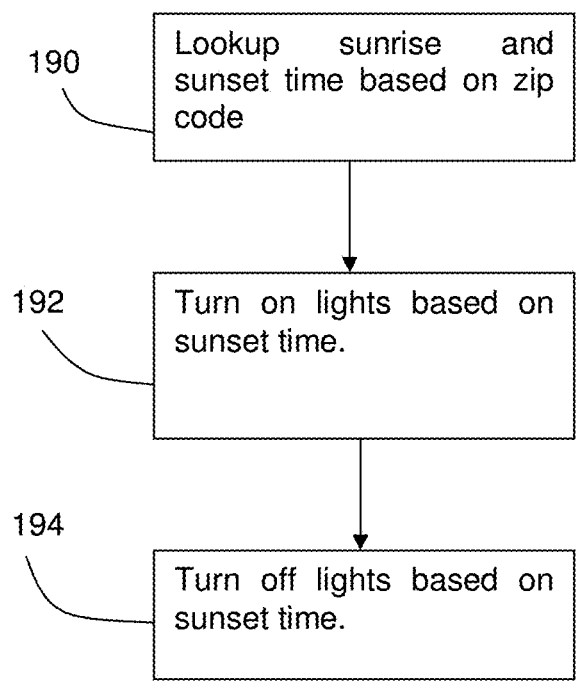

As seen in FIG. 27, the lights can also be controlled based on the sunset and sunrise times determined by the zip code or latitude/longitude coordinates inputted by the user. In 190, the module 100 looks up the sunrise and sunset time for a specific date. In 192, the module 100 turns on the lights based on the sunset time. Optionally, the user may add an adjustment time via a light adjustment interface so that the lights can be turned on at a predetermined time before or after sunset. In 194, the module 100 turns off the lights based on the sunrise time. Again, the user may optionally add an adjustment time via a light adjustment interface so that the lights can be turned off at a predetermined time before or after sunrise. Additionally, either the sunrise or sunset based on/off times can be manually overridden with a predetermined on/off time (e.g., the lights turn off at 11 pm).

While the module 100, 200 has been shown outside of the irrigation controller, it should be understood that the module could also be mounted onto or inside the irrigation controller.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation control device comprising:
   a control device housing;
   electrical circuitry disposed in said housing and configured to process and store data; and,
   a first communication link in communication with said electrical circuitry and configured to communicate with a rain sensor; said rain sensor comprising a hygroscopic material that expands when contacted with moisture to activate a switch that causes a rain threshold signal to be transmitted;
   wherein said electrical circuitry is configured to receive said rain threshold signal from said rain sensor via said first communication link and calculate an estimated rain fall amount;
   wherein said electrical circuitry is configured to determine a rainfall time based at least on monitoring an amount of time said rain threshold signal is active; and,
   said electrical circuitry is further configured to calculate said estimated rain fall amount by multiplying an estimated rainfall rate with said rainfall time; and,
   wherein said electrical circuitry is further configured to communicate a signal to an irrigation controller controlling adjustment of an irrigation schedule of said irrigation controller based on said estimated rain fall amount;
   wherein said amount of time said rain threshold signal is active is increased by a known time said hygroscopic material of said rain sensor saturates with rain and wherein said amount of time said rain threshold signal is active is decreased by a known time said hygroscopic material of said rain sensor dries to release said rain threshold signal; and,
   wherein said rainfall rate is selected from: a predetermined average rainfall rate, an average rainfall rate for a geographic area during a known time of year, or a rainfall rate obtained via a remote data source.

2. The irrigation control device of claim 1, wherein said electrical circuitry further calculates an estimated ET value for adjusting an irrigation schedule.

3. The irrigation control device of claim 1, wherein said irrigation control device is separate from and in communication with an irrigation controller.

4. An irrigation control device comprising:
   a control device housing;
   electrical circuitry disposed in said housing and configured to process and store data; and,
   a rain sensor separate from said control device housing and in wired or wireless communication with said electrical circuitry; said rain sensor comprising a hygroscopic material that expands when contacted with moisture, so as to activate a position-sensitive sensor or switch that causes a rain threshold signal to be transmitted;
   wherein said electrical circuitry is configured to receive said rain threshold signal from said rain sensor via said first communication link and calculate an estimated rain fall amount based on multiplying an estimated rainfall rate with an amount of time said rain threshold signal is continuously active;
   wherein said electrical circuitry is further configured to communicate a signal to an irrigation controller controlling adjustment of an irrigation schedule; said signal being based on said estimated rain fall amount;
   wherein said estimated rain fall amount is calculated by monitoring said amount of time said rain threshold signal is continuously active, adjusting for an amount of water needed to expand said hygroscopic material to activate said position-sensitive sensor or switch, and adjusting for an amount of time needed to dry said hygroscopic material to deactivate said position-sensitive sensor or switch; and,
   wherein said estimated rain fall amount is calculated with a said estimated rainfall rate that is selected from: a predetermined average rainfall rate, an average rainfall rate for a geographic area during a known time of year, or a rainfall rate obtained via a remote data source.

5. The irrigation control device of claim 4, wherein said amount of time needed to dry said hygroscopic material of said rain sensor is calculated based on a solar radiation sensor.

6. A method of operating an irrigation control device comprising:
   transmitting a rain threshold signal when a hygroscopic material of a rain sensor activates a position-sensitive sensor or switch;
   receiving with said irrigation control device a rain threshold signal from a hygroscopic rain sensor;
   monitoring and storing with said irrigation control device an amount of time said rain threshold signal is active;
   multiplying an estimated rainfall rate by said amount of time said rain threshold signal is active to determine an estimated rainfall amount; and,
   communicating a signal to an irrigation controller so as to cause said irrigation controller to adjust an irrigation schedule based on said estimated rainfall amount;
   wherein said amount of time said rain threshold signal is active is adjusted by a known time or rainfall amount required to expand hygroscopic material in said hygroscopic rain sensor to activate said rain threshold signal, adjusted by a known time dry out time of say hygroscopic material; and
   wherein said rainfall rate is selected from: a predetermined average rainfall rate, an average rainfall rate for a geographic area during a known time of year, or a rainfall rate obtained via a remote data source.

* * * * *